United States Patent
Hayashi

(10) Patent No.: US 11,661,886 B2
(45) Date of Patent: May 30, 2023

(54) VARIABLE CAPACITY TURBOCHARGER

(71) Applicant: IHI Corporation, Tokyo (JP)

(72) Inventor: Katsunori Hayashi, Tokyo (JP)

(*) Notice: Subject to any disclaimer, the term of this patent is extended or adjusted under 35 U.S.C. 154(b) by 72 days.

(21) Appl. No.: 17/330,476

(22) Filed: May 26, 2021

(65) Prior Publication Data

US 2021/0277822 A1 Sep. 9, 2021

Related U.S. Application Data

(63) Continuation of application No. PCT/JP2019/028899, filed on Jul. 23, 2019.

(30) Foreign Application Priority Data

Dec. 4, 2018 (JP) .............................. JP2018-227091

(51) Int. Cl.
*F02B 37/22* (2006.01)
*F01D 25/12* (2006.01)

(52) U.S. Cl.
CPC .............. *F02B 37/22* (2013.01); *F01D 25/12* (2013.01); *F05D 2240/50* (2013.01); *F05D 2240/55* (2013.01)

(58) Field of Classification Search
CPC .......... F02B 37/22; F02B 37/24; F02B 39/00; F01D 25/12; F01D 25/162; F01D 17/165; F05D 2240/15; F05D 2240/50; F05D 2240/55; F05D 2220/40
See application file for complete search history.

(56) References Cited

U.S. PATENT DOCUMENTS

| | | | |
|---|---|---|---|
| 2007/0175216 A1 | 8/2007 | Kobayashi | |
| 2010/0284824 A1* | 11/2010 | Hippen | F02C 6/12 |
| | | | 415/110 |
| 2014/0248137 A1 | 9/2014 | Inoue et al. | |
| 2016/0356283 A1* | 12/2016 | Futae | F04D 29/284 |

(Continued)

FOREIGN PATENT DOCUMENTS

| | | |
|---|---|---|
| CN | 101012772 | 8/2007 |
| CN | 104018936 | 9/2014 |

(Continued)

OTHER PUBLICATIONS

International Search Report dated Oct. 8, 2019 for PCT/JP2019/028899.

(Continued)

*Primary Examiner* — Loren C Edwards
(74) *Attorney, Agent, or Firm* — Soei Patent & Law Firm

(57) ABSTRACT

A turbocharger includes a variable nozzle unit, a bearing housing, a circular heat shield plate located between a turbine impeller and the bearing housing, and a water chamber formed in the bearing housing. The heat shield plate is fixed by being pressed against the variable nozzle unit by a disc spring and is radially aligned by being fitted into the bearing housing by a fitting portion. The heat shield plate includes a fitting surface formed in the fitting portion and an inner peripheral heat shield portion projecting radially inward from the fitting surface and located with an axial gap between the inner peripheral heat shield portion and the bearing housing. At least a part of the water chamber exists at the same radial position as a radial position of the fitting portion.

12 Claims, 2 Drawing Sheets

(56) References Cited

U.S. PATENT DOCUMENTS

2017/0058764 A1    3/2017  Bayod et al.
2017/0298813 A1*  10/2017  Ikeda .................... F01D 11/003
2018/0030848 A1    2/2018  Kobayashi et al.

FOREIGN PATENT DOCUMENTS

| CN | 104884761 | 9/2015 |
| CN | 105143635 | 12/2015 |
| CN | 106715863 | 5/2017 |
| CN | 107208546 | 9/2017 |
| DE | 102015217668 | 3/2017 |
| DE | 102015217668 A1 * | 3/2017 |
| JP | S63-143326 | 6/1988 |
| JP | H2-092032 | 7/1990 |
| JP | 2005-042588 | 2/2005 |
| JP | 2007-187015 | 7/2007 |
| JP | 2011-252439 | 12/2011 |
| JP | 2012-057592 | 3/2012 |
| JP | 2013015120 A * | 1/2013 |
| JP | 2013-124649 | 6/2013 |
| JP | 2013-199858 | 10/2013 |
| JP | 2016-003565 | 1/2016 |
| JP | 2017-145770 | 8/2017 |
| WO | 2016/052231 | 4/2016 |
| WO | 2016/159004 | 10/2016 |

OTHER PUBLICATIONS

International Preliminary Report on Patentability with Written Opinion dated Jun. 17, 2021 for PCT/JP2019/028899.

* cited by examiner

VARIABLE CAPACITY TURBOCHARGER

CROSS-REFERENCE TO RELATED APPLICATION

This application is a continuation application of PCT Application No. PCT/JP2019/028899, filed Jul. 23, 2019, the entire contents of which are incorporated herein by reference.

BACKGROUND

As conventional variable capacity turbochargers, examples described in Japanese Unexamined Patent Publication No. 2005-42588, Japanese Unexamined Patent Publication No. 2011-252439 or Japanese Unexamined Patent Publication No. 2012-057592. The turbocharger described in Japanese Unexamined Patent Publication No. 2005-42588 includes a circular heat shield plate. The heat shield plate blocks heat of a turbine to prevent a temperature rise of a bearing housing. An attachment part exists in an inner peripheral portion of the bearing housing. The attachment part has a cylindrical shape and rises toward the turbine in the periphery of a rotation shaft of a turbine impeller. A center hole of the heat shield plate is inserted to the cylindrical attachment part and the heat shield plate is aligned in the radial direction.

SUMMARY

However, according to the above-described heat shield plate aligning structure, the attachment part is not covered by the heat shield plate and is exposed to the turbine side. Therefore, the radiant heat on the turbine side easily enters the bearing housing through the attachment part. Further, the heat of the heat shield plate is easily conducted to the attachment part through a fitted part. As a result, a temperature rise of the bearing housing cannot be sufficiently suppressed in the inner peripheral portion of the bearing housing. There are also important parts related to the rotation shaft of the turbine impeller on the inner peripheral portion of the bearing housing. Then, there is concern that the function may be impaired when the temperature of such important parts rises excessively. Here, the present disclosure will describe a variable capacity turbocharger that suppresses a temperature rise of parts in the inner peripheral portion of the bearing housing.

A variable capacity turbocharger according to an aspect of the present disclosure is a variable capacity turbocharger comprising a variable nozzle unit rotating a nozzle vane inside a nozzle flow passage of a turbine, a bearing housing accommodating a bearing of a rotation shaft of a turbine impeller of the turbine, a circular heat shield plate located between the turbine impeller and the bearing housing and surrounding the rotation shaft in a circumferential direction, and a water chamber formed in the bearing housing and circulating a cooling water, wherein the heat shield plate is axially sandwiched between the variable nozzle unit and the bearing housing together with a disc spring, is fixed by being axially pressed against the variable nozzle unit by the disc spring, and is radially aligned by being fitted into the bearing housing by a fitting portion extending in the circumferential direction, wherein the heat shield plate comprises a fitting surface formed in the fitting portion and fitted into the bearing housing, and an inner peripheral heat shield portion projecting radially inward from the fitting surface and located with an axial gap between the inner peripheral heat shield portion and the bearing housing, and wherein at least a part of the water chamber exists at the same radial position as a radial position of the fitting portion.

According to the variable capacity turbocharger of the present disclosure, it is possible to suppress a temperature rise of parts of an inner peripheral portion of a bearing housing.

DETAILED DESCRIPTION

A variable capacity turbocharger according to an aspect of the present disclosure is a variable capacity turbocharger comprising a variable nozzle unit rotating a nozzle vane inside a nozzle flow passage of a turbine, a bearing housing accommodating a bearing of a rotation shaft of a turbine impeller of the turbine, a circular heat shield plate located between the turbine impeller and the bearing housing and surrounding the rotation shaft in a circumferential direction, and a water chamber formed in the bearing housing and circulating a cooling water, wherein the heat shield plate is axially sandwiched between the variable nozzle unit and the bearing housing together with a disc spring, is fixed by being axially pressed against the variable nozzle unit by the disc spring, and is radially aligned by being fitted into the bearing housing by a fitting portion extending in the circumferential direction, wherein the heat shield plate comprises a fitting surface formed in the fitting portion and fitted into the bearing housing, and an inner peripheral heat shield portion projecting radially inward from the fitting surface and located with an axial gap between the inner peripheral heat shield portion and the bearing housing, and wherein at least a part of the water chamber exists at the same radial position as a radial position of the fitting portion.

The fitting portion may be located inside of an outer peripheral edge of the turbine impeller in the radial direction.

The bearing housing may comprise a heat shield plate receiving surface facing the fitting surface of the heat shield plate and a disc spring installation surface on which the disc spring is provided, and the disc spring installation surface may be formed to be flush with the heat shield plate receiving surface.

Figure 1:
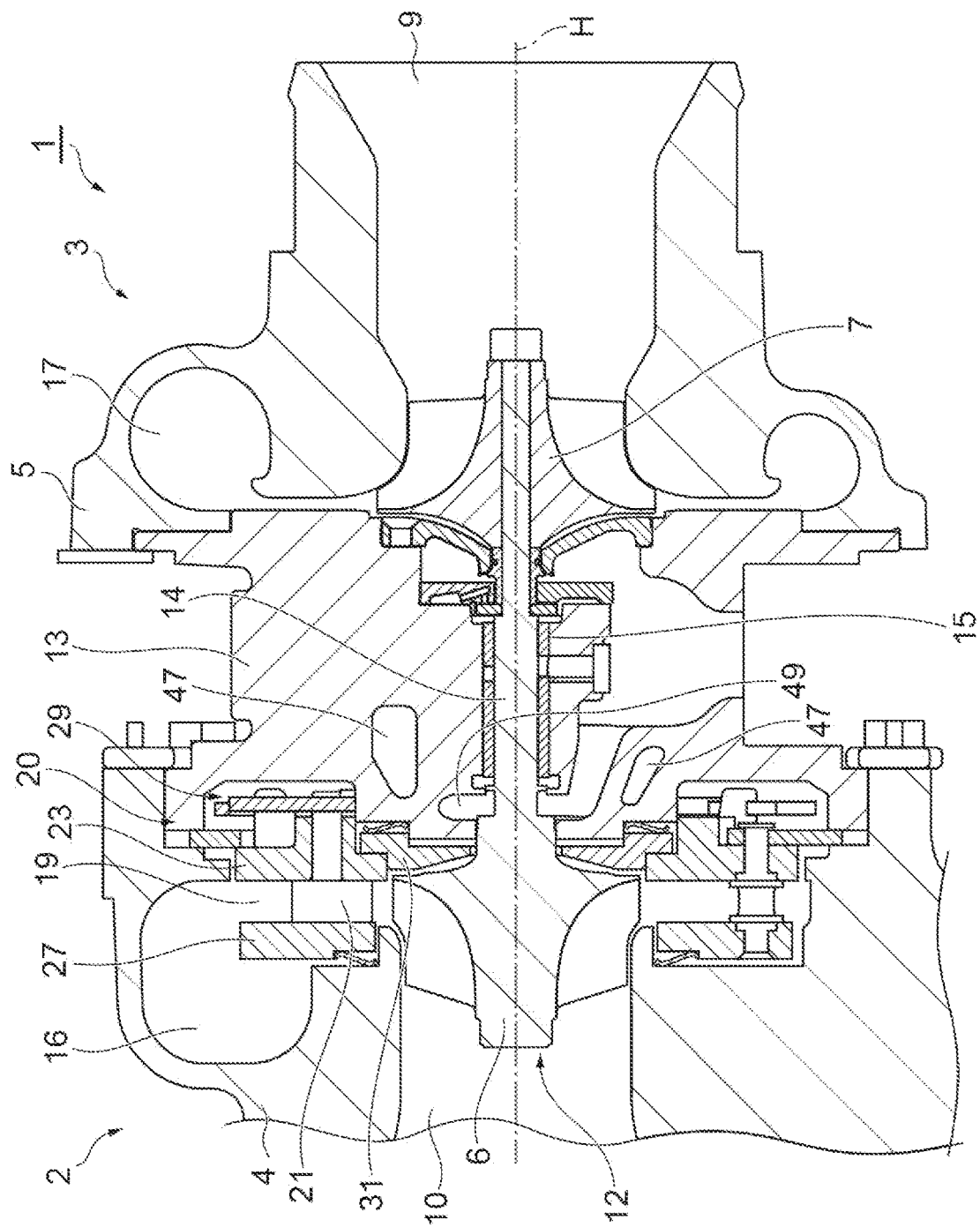
FIG. 1 is a cross-sectional view of a variable capacity turbocharger of this example.

Hereinafter, an example of the present disclosure will be described in detail with reference to the drawings. FIG. 1 is a cross-sectional view of a variable capacity turbocharger 1 including a rotation axis H. The turbocharger 1 is applied to, for example, an internal combustion engine of a ship or a vehicle.

As illustrated in FIG. 1, the turbocharger 1 includes a turbine 2 and a compressor 3. The turbine 2 includes a turbine housing 4 and a turbine impeller 6 accommodated in the turbine housing 4. The turbine housing 4 includes a scroll flow passage 16 extending in the circumferential direction around the turbine impeller 6. The compressor 3 includes a compressor housing 5 and a compressor impeller 7 accommodated in the compressor housing 5. The compressor housing 5 includes a scroll flow passage 17 extending in the circumferential direction around the compressor impeller 7.

The turbine impeller 6 is provided at one end of a rotation shaft 14 and the compressor impeller 7 is provided at the other end of the rotation shaft 14. A bearing housing 13 is provided between the turbine housing 4 and the compressor housing 5. The rotation shaft 14 is rotatably supported by the bearing housing 13 through a bearing 15 and the rotation shaft 14, the turbine impeller 6, and the compressor impeller 7 rotate around the rotation axis H as an integral rotation body 12.

The turbine housing 4 is provided with an exhaust gas inlet (not illustrated) and an exhaust gas outlet 10. An exhaust gas discharged from an internal combustion engine (not illustrated) flows into the turbine housing 4 through the exhaust gas inlet, flows into the turbine impeller 6 through the scroll flow passage 16, and rotates the turbine impeller 6. Then, the exhaust gas flows to the outside of the turbine housing 4 through the exhaust gas outlet 10.

The compressor housing 5 is provided with a suction port 9 and a discharge port (not illustrated). When the turbine impeller 6 rotates as described above, the compressor impeller 7 rotates through the rotation shaft 14. The rotating compressor impeller 7 sucks external air through the suction port 9. This air passes through the compressor impeller 7 and the scroll flow passage 17 to be compressed and is discharged from the discharge port. The compressed air discharged from the discharge port is supplied to the internal combustion engine described above.

The turbine 2 of the turbocharger 1 will be further described. In the description below, the "axial direction", the "radial direction", and the "circumferential direction" respectively simply mean the rotation axis direction (the direction of the rotation axis H), the rotation radial direction, and the rotation circumferential direction of the turbine impeller 6.

The turbine 2 of the turbocharger 1 is provided with a nozzle flow passage 19 connecting the scroll flow passage 16 to the turbine impeller 6. The nozzle flow passage 19 is provided with a plurality of movable nozzle vanes 21. The plurality of nozzle vanes 21 are arranged at equal intervals on the circumference around the rotation axis H. The nozzle vanes 21 rotate around an axis parallel to the rotation axis H in a synchronization manner. Since the plurality of nozzle vanes 21 rotate as described above, the opening degree of the nozzle flow passage 19 is adjusted when a gap between the adjacent nozzle vanes 21 is expanded and contracted.

In order to drive the nozzle vane 21 as described above, the turbine 2 includes a variable nozzle unit 20. The variable nozzle unit 20 is fitted into the turbine housing 4. The variable nozzle unit 20 includes the plurality of nozzle vanes 21 and two nozzle rings 23 and 27. Two nozzle rings 23 and 27 sandwich the nozzle vanes 21 in the axial direction. Each of the nozzle rings 23 and 27 has a ring shape around the rotation axis H and is disposed to surround the turbine impeller 6 in the circumferential direction. A region sandwiched between two nozzle rings 23 and 27 in the axial direction forms the nozzle flow passage 19 described above. The variable nozzle unit 20 includes a drive mechanism 29 for driving the nozzle vane 21. The drive mechanism 29 is accommodated in a space between the nozzle ring 23 and the bearing housing 13 and transmits a drive force from an external actuator (not illustrated) to the nozzle vane 21.

Figure 2:
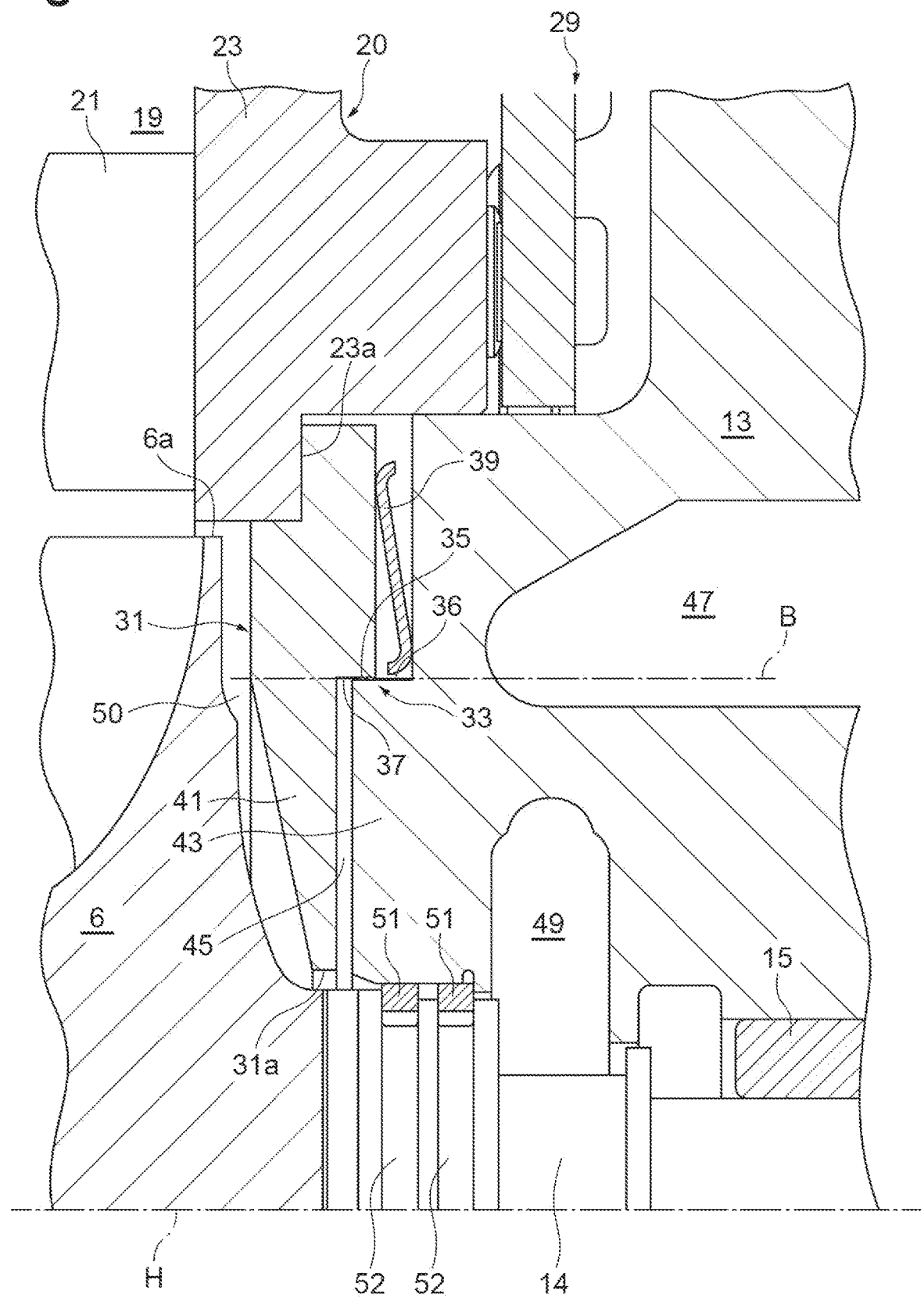
FIG. 2 is an enlarged cross-sectional view illustrating the vicinity of a heat shield plate of the turbocharger of FIG. 1.

FIG. 2 is an enlarged cross-sectional view illustrating the vicinity of the turbine impeller 6 of the turbocharger 1. The bearing housing 13 is provided with an oil chamber 49 supplying lubricating oil to the bearing 15. A seal ring 51 is attached to the outer periphery of the rotation shaft 14. The seal ring 51 partitions the oil chamber 49 and a space (hereinafter, referred to as an "exhaust gas space 50") where the exhaust gas sent from the nozzle flow passage 19 to the turbine impeller 6 exists. The rotation shaft 14 is provided with a groove 52 extending in the circumferential direction. The seal ring 51 is fitted into the groove 52 so that the movement in the axial direction is regulated. Further, the outer peripheral surface of the seal ring 51 contacts the bearing housing 13 in the entire circumference. The seal ring 51 partitions the oil chamber 49 from the exhaust gas space 50 by blocking a gap between the rotation shaft 14 and the bearing housing 13 in the radial direction. Then, it is possible to disturb the movement of the lubricating oil existing in the oil chamber 49 toward the exhaust gas space 50 due to the seal ring 51. Additionally, in the example of FIG. 2, two seal rings 51 are provided in parallel in the axial direction.

A heat shield plate 31 is provided between the turbine impeller 6 and the bearing housing 13. The heat shield plate 31 suppresses a temperature rise of the bearing housing 13 by shielding the heat radiated from the high-temperature exhaust gas space 50. The heat shield plate 31 is formed in a ring shape that surrounds the rotation shaft 14 in the circumferential direction. The heat shield plate 31 is fitted into the bearing housing 13. A fitting portion 33 between the heat shield plate 31 and the bearing housing 13 extends in the circumferential direction in the vicinity of the center of the radial width of the heat shield plate 31.

The fitting portion 33 is provided with a heat shield plate receiving surface 35 for fitting the heat shield plate 31 into the bearing housing 13. The heat shield plate receiving surface 35 forms a cylindrical outer surface about the rotation axis H. In contrast, the heat shield plate 31 is provided with a fitting surface 37 facing the heat shield plate receiving surface 35. The fitting surface 37 forms a cylindrical inner surface about the rotation axis H. The fitting portion 33 is located inside of an outer peripheral edge 6a of the turbine impeller 6 in the radial direction.

The heat shield plate 31 is aligned in the radial direction by fitting the heat shield plate 31 into the bearing housing 13 as described above. Additionally, the fitting state between the heat shield plate 31 and the bearing housing 13 is a clearance fit. The heat shield plate receiving surface 35 and the fitting surface 37 may be in sliding contact with each other or a slight gap may exist between the heat shield plate receiving surface 35 and the fitting surface 37.

Further, a disc spring 39 is installed at a position adjacent to the compressor 3 in the heat shield plate 31. The disc spring 39 has a ring shape around the rotation axis H.

A disc spring installation surface 36 for installing the disc spring 39 is formed in the bearing housing 13. The disc spring installation surface 36 forms a cylindrical outer surface about the rotation axis H. The disc spring 39 is aligned in the radial direction such that its center hole is installed to surround the disc spring installation surface 36 in the circumferential direction. The disc spring installation surface 36 is formed to be continuous to the side of the compressor 3 of the heat shield plate receiving surface 35. Further, the disc spring installation surface 36 is formed to be flush with the heat shield plate receiving surface 35.

Further, the disc spring 39 is sandwiched between the heat shield plate 31 and the bearing housing 13 in the axial direction. Then, the heat shield plate 31 is pressed toward the turbine impeller 6 by the urging force of the disc spring 39 so that the heat shield plate 31 is pressed against an end surface 23a of the nozzle ring 23 in the axial direction. With such a structure, the heat shield plate 31 is sandwiched and fixed between the variable nozzle unit 20 and the bearing housing 13 in the axial direction together with the disc spring 39.

The heat shield plate 31 includes an inner peripheral heat shield portion 41 which projects radially inward from the fitting surface 37. When viewed from the side of the turbine 2, the inner peripheral heat shield portion 41 covers a portion of the bearing housing 13 which is located on an inner peripheral side of the fitting portion 33. In other words, when viewed from the side of the turbine 2, the inner peripheral heat shield portion 41 covers an inner peripheral portion 43 of the bearing housing 13 which is located closer to the rotation axis H than the fitting portion 33 in the radial direction. Hereinafter, the portion of the bearing housing 13 which is located inner peripheral side of the fitting portion 33 (which is located closer to the rotation axis H than the fitting portion 33 in the radial direction) will be referred to as a "bearing housing inner peripheral portion" and will be denoted by Reference Numeral "43". Further, since the heat shield plate 31 is pressed toward the turbine 2 by the disc spring 39 as described above, an axial gap 45 is formed between the inner peripheral heat shield portion 41 and the bearing housing inner peripheral portion 43.

The bearing housing 13 is provided with a water chamber 47 for circulating cooling water. The bearing housing 13 is cooled by the cooling water. The water chamber 47 is formed as a cavity of the bearing housing 13 and extends in the circumferential direction. Regarding the positional relationship between the water chamber 47 and the fitting portion 33, at least a part of the water chamber 47 exists at the same radial position as that of the fitting portion 33. For example, in a cross-section illustrated in FIG. 2, the fitting portion 33 and the inner peripheral portion of the water chamber 47 exist at the same radial position as indicated by a one-dotted chain line B. At least one such cross-section exists in the bearing housing 13. In the entire circumferential direction, the water chamber 47 and a part of the fitting portion 33 may exist at the same radial position.

The technical effect of the turbocharger 1 with the above-described configuration will be described. For example, in order to secure a normal seal function by suppressing a temperature rise of the seal ring 51, it is important to suppress a temperature rise of the bearing housing inner peripheral portion 43. In the turbocharger 1, the inner peripheral heat shield portion 41 of the heat shield plate 31 projects radially inward from the fitting surface 37. Then, the inner peripheral heat shield portion 41 is covered by the bearing housing inner peripheral portion 43 when viewed from the exhaust gas space 50. Such an inner peripheral heat shield portion 41 shields the heat radiated from the exhaust gas space 50 toward the bearing housing inner peripheral portion 43. Further, since the gap 45 is formed between the inner peripheral heat shield portion 41 and the bearing housing inner peripheral portion 43, the conductive heat from the inner peripheral heat shield portion 41 to the bearing housing inner peripheral portion 43 is also suppressed.

On the other hand, as the conductive heat from the heat shield plate 31 to the bearing housing inner peripheral portion 43, the conductive heat transmitted via the fitting portion 33 can be considered. However, since the fitting portion 33 is located in the vicinity of the center of the radial width of the heat shield plate 31, the fitting portion 33 and the seal ring 51 are separated to some extent. Further, at least a part of the water chamber 47 exists at the same radial position as that of the fitting portion 33. Due to this positional relationship, the fitting portion 33 is easily cooled by the cooling water of the water chamber 47 and the conductive heat passing through the fitting portion 33 is also easily removed. Thus, the conductive heat entering from the heat shield plate 31 to the bearing housing inner peripheral portion 43 via the fitting portion 33 is also suppressed.

Further, the conductive heat transmitted from the heat shield plate 31 to the bearing housing 13 via the disc spring 39 is also easily cooled by the cooling water of the water chamber 47 as described above and is not easily transmitted to the bearing housing inner peripheral portion 43.

As described above, a temperature rise of the bearing housing inner peripheral portion 43 due to the heat of the exhaust gas space 50 is suppressed. As a result, a temperature rise of the seal ring 51 is suppressed and a normal seal function of the seal ring 51 is secured.

Further, the fitting portion 33 is located inside of the outer peripheral edge 6a of the turbine impeller 6 in the radial direction. Here, in the fitting portion 33, a gap is generated between the heat shield plate 31 and the bearing housing inner peripheral portion 43 due to a difference in thermal expansion therebetween, but the gap becomes larger as the position of the fitting portion 33 becomes closer to the outside in the radial direction. Then, the off-center (misalignment) of the heat shield plate 31 due to the gap becomes large. For this reason, in order to avoid the interference between an innermost peripheral portion 31a of the heat shield plate 31 and the rotation shaft 14 due to the off-center, a gap between the innermost peripheral portion 31a and the rotation shaft 14 needs to be designed to be large. Then, the exhaust gas of the exhaust gas space 50 easily reaches the seal ring 51 through the gap to thereby cause a temperature rise of the seal ring 51. In view of this finding, in the turbocharger 1, the fitting portion 33 is located inside of the outer peripheral edge 6a of the turbine impeller 6 in the radial direction so that the fitting portion 33 does not move too far outward in the radial direction. Accordingly, the above-described problems are avoided.

Further, the disc spring installation surface 36 is continuously formed to be flush with the heat shield plate receiving surface 35. With this structure, a part for installing and aligning the disc spring 39 does not need to be formed separately from the heat shield plate receiving surface 35. As a result, the bearing housing 13 and the heat shield plate 31 can be simply processed.

The invention claimed is:

1. A variable capacity turbocharger comprising:
   a variable nozzle unit rotating a nozzle vane inside a nozzle flow passage of a turbine;
   a bearing housing accommodating a bearing supporting a rotation shaft of a turbine impeller of the turbine;
   a circular heat shield plate located between the turbine impeller and the bearing housing and surrounding the rotation shaft in a circumferential direction of the rotation shaft; and
   a water chamber which is provided in the bearing housing and circulates a cooling water,
   wherein the heat shield plate is sandwiched between the variable nozzle unit and the bearing housing together with a disc spring in an axial direction of the rotation shaft, is fixed by being pressed against the variable nozzle unit by the disc spring in the axial direction, and is aligned in a radial direction of the rotation shaft by being fitted into the bearing housing by a fitting portion extending in the circumferential direction,
   wherein the bearing housing comprises a heat shield plate receiving surface for fitting the heat shield plate into the bearing housing,
   wherein the heat shield plate comprises:

a fitting surface which faces the heat shield plate receiving surface of the bearing housing and is fitted into the bearing housing; and
an inner peripheral heat shield portion projecting radially inward from the fitting surface and located with a gap between the bearing housing and the inner peripheral heat shield portion in the axial direction,
wherein the fitting portion is formed by the heat shield plate receiving surface of the bearing housing and the fitting surface of the heat shield plate,
wherein at least a part of the water chamber exists at a same radial position as a radial position of the heat shield plate receiving surface and a radial position of the fitting surface,
wherein the water chamber extends in the axial direction and comprises:
an outer periphery surface;
an inner periphery surface;
a first edge on the outer periphery surface;
a second edge on the inner periphery surface; and
an end surface connecting the first edge and the second edge,
wherein the second edge is located closer to the fitting portion than the first edge, and
wherein the end surface of the water chamber inclines relative to the rotation shaft.

2. The variable capacity turbocharger according to claim 1,
wherein the fitting portion is located inside of an outer peripheral edge of the turbine impeller in the radial direction.

3. The variable capacity turbocharger according to claim 1,
wherein the bearing housing comprises a disc spring installation surface on which the disc spring is provided, and
wherein the disc spring installation surface is formed to be flush with the heat shield plate receiving surface.

4. The variable capacity turbocharger according to claim 1,
wherein the end surface of the water chamber inclines uniformly relative to the rotation shaft.

5. The variable capacity turbocharger according to claim 1,
wherein the end surface of the water chamber makes an acute angle with the rotation shaft.

6. A turbocharger comprising:
a turbine impeller;
a bearing housing;
a rotation shaft;
a circular heat shield plate which is provided between the turbine impeller and the bearing housing in an axial direction of the rotation shaft, and surrounds the rotation shaft in a circumferential direction;
a fitting portion at which the heat shield plate is fitted into the bearing housing; and
a water chamber which is provided in the bearing housing and circulates a cooling water,
wherein the bearing housing comprises a heat shield plate receiving surface for fitting the heat shield plate into the bearing housing,
wherein the heat shield plate comprises a fitting surface which faces the heat shield plate receiving surface of the bearing housing and is fitted into the bearing housing,
wherein the fitting portion is formed by the heat shield plate receiving surface of the bearing housing and the fitting surface of the heat shield plate,
wherein at least a part of the water chamber exists at a same radial position as a radial position of the heat shield plate receiving surface and a radial position of the fitting surface,
wherein the water chamber extends in the axial direction and comprises:
an outer periphery surface;
an inner periphery surface,
a first edge on the outer periphery surface;
a second edge on the inner periphery surface; and
an end surface connecting the first edge and the second edge,
wherein the second edge is located closer to the fitting portion than the first edge, and
wherein the end surface of the water chamber inclines relative to the rotation shaft.

7. The turbocharger according to claim 6, wherein the part of the water chamber exists at the same radial position as the radial position of the heat shield plate receiving surface and the radial position of the fitting surface in an entire circumferential direction of the rotation shaft.

8. The turbocharger according to claim 6, further comprising a disc spring which is sandwiched between the heat shield plate and the bearing housing in the axial direction, and presses the heat shield plate toward the turbine impeller,
wherein at least a part of the water chamber exists at a same radial position as a radial position of the disc spring.

9. The turbocharger according to claim 6,
wherein the bearing housing comprises a disc spring installation surface on which a disc spring is provided, and
wherein the disc spring installation surface is formed to be flush with the heat shield plate receiving surface.

10. The turbocharger according to claim 9, wherein at least the part of the water chamber exists at a same radial position as a radial position of the disc spring installation surface and the heat shield plate receiving surface.

11. The turbocharger according to claim 6,
wherein the end surface of the water chamber inclines uniformly relative to the rotation shaft.

12. The turbocharger according to claim 6,
wherein the end surface of the water chamber makes an acute angle with the rotation shaft.

* * * * *